Aug. 14, 1928.   1,681,062
J. H. SPARSHATT
COVER FOR VEHICLES
Filed Aug. 17, 1925   2 Sheets-Sheet 1
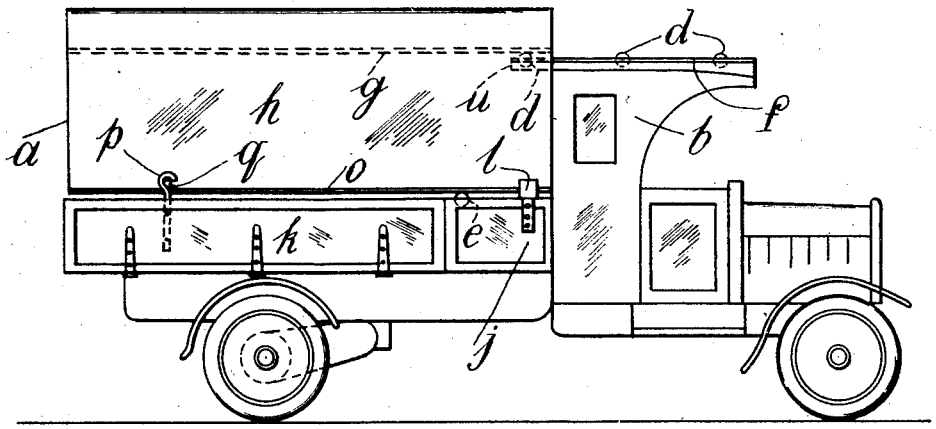
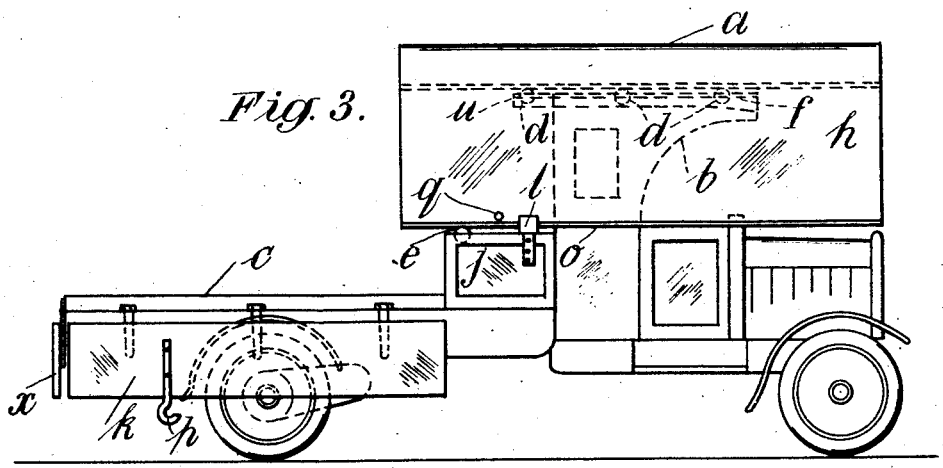
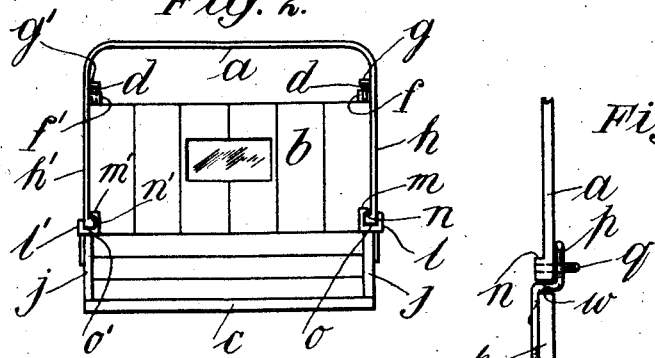
INVENTOR:
JOHN HERBERT SPARSHATT.
ATTORNEY.

Aug. 14, 1928.　　　　　　　　　　　　　　　　　1,681,062
J. H. SPARSHATT
COVER FOR VEHICLES
Filed Aug. 17, 1925　　　2 Sheets-Sheet 2
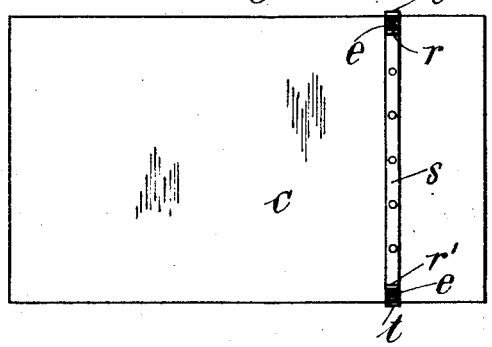
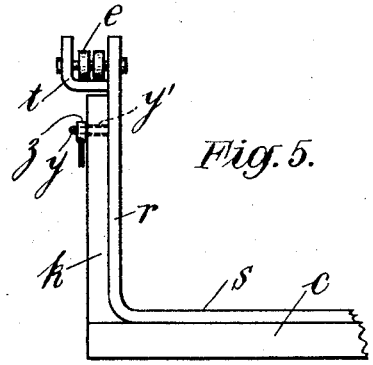
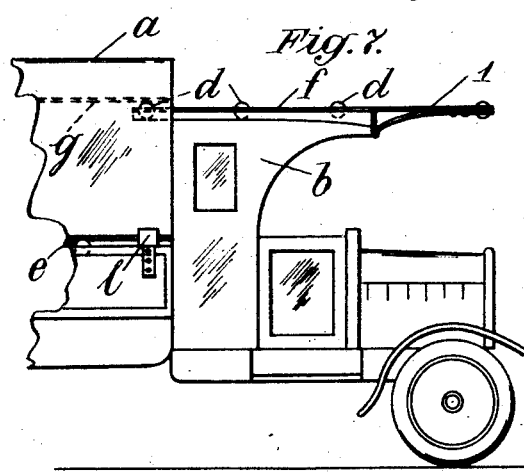
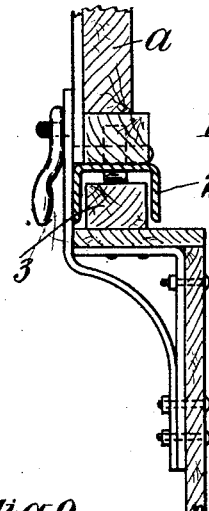
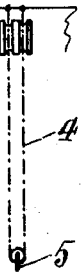
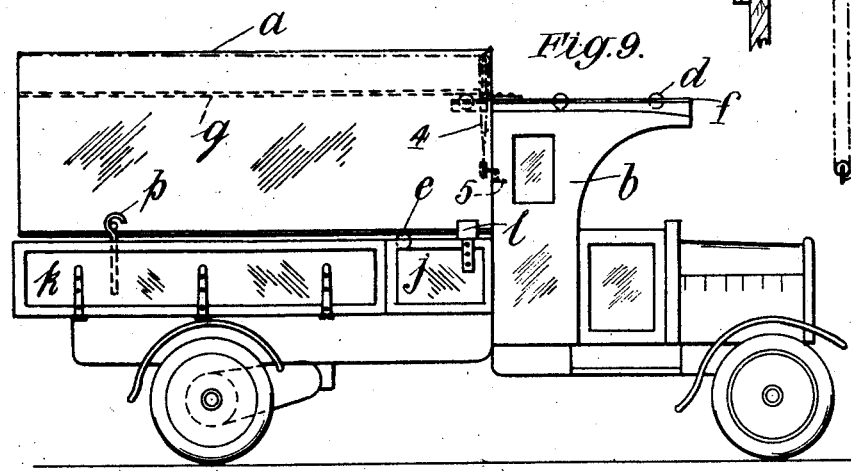
INVENTOR:
JOHN HERBERT SPARSHATT,
ATTORNEY.

Patented Aug. 14, 1928.

1,681,062

UNITED STATES PATENT OFFICE.

JOHN HERBERT SPARSHATT, OF PORTSMOUTH, ENGLAND.

COVER FOR VEHICLES.

Application filed August 17, 1925, Serial No. 50,672, and in Great Britain April 16, 1925.

The present invention relates to improvements in and relating to road vehicles, and being particularly applicable to covered motor-transport vehicles it will be hereinafter described in that application, though many of its features can obviously be applied to other vehicles.

The present invention aims in particular to facilitate the ready loading and unloading of weather-proof covered motor-transport and other vehicles having a tilt or a like or equivalent covering which is structurally permanent, or virtually so in relation to the manner in which it is incorporated in the vehicle for the purpose of the present invention.

To this and other ends the present invention broadly consists in a road vehicle having a tilt capable of bodily sliding into supporting relationship with a forward support to wholly or partially expose the vehicle floor for derrick, crane, and hoist loading and unloading.

Such a sliding tilt or like may be incorporated in vehicles having drop or removable sides or fixed sides according to the particular service to which the vehicle is in general to be put, the combination of drop or removable sides and a sliding tilt giving the power of both top and side loading, end loading stepping in with the usual tail board or other provision suited therefor.

In general for ordinary purposes the tilt or like in one simple aspect of the present invention will be as a permanent built-up structure which, except that it is capable of sliding, may be otherwise like or similar in general make-up to the usual fixed tilts or like.

Structures capable of being broken down or collapsed like or similar to the loose hoop and roll-up canvas coverings are not however excluded from the present invention, provided that as assembled structures they are capable of sliding for the purpose of the present invention.

The present invention particularly deals with cases in which the longer or heavier commercial vehicles are concerned.

Thus the present invention provides for an extension of the cab on which the tilt slides to expose the floor of the vehicle, such an extension of the cab being exemplified by the following:—brackets fixed or hinged to the front of the cab to extend the runway for the tilt, or the cab built with the top rails or the roof extended in proportion to the length of the vehicle in question.

According to the present invention also power or force transmission means are incorporated in desired cases, such as when dealing with heavy vehicles, such power or force transmission means to be operated either by hand or power.

By way of one example, a wire rope may be connected at one end to the rear end of the tilt and run over a pulley to the inside of the cab or to the chassis frame where the rope may be related to a wheel and handle and connected at the other end to the front end of the tilt so that the tilt may be wound forwards and backwards.

Included also in the present invention is provision when dealing with heavy loads for preventing the load pressure from bulging the sides of the tilt.

One way of doing this is to provide the bottom of the tilt with steel channels which have a sliding fit over rails fixed to the sides of the vehicle.

Roller bearings may ride on the top of the rails and the rails may be supported on outside brackets carried by the sides of the vehicle.

In general however to lastingly withstand the hard and rough usage of a transport vehicle, a tilt or like made up as a permanent rigid structure, is preferred and such a rigid tilt is shown in the accompanying drawings, in which:—

Fig. 1 is a side view of a motor vehicle showing the tilt in normal position, Fig. 2 a back view thereof, and Fig. 3 a side view in which the tilt is shown slid over the cab so as to facilitate unloading of the truck-body. Fig. 4 is a plan view of a variant form of support for the tilt, and Fig. 5 a detail view thereof. Fig. 6 is a detail view of a device for locking the tilt in its normal position. Fig. 7 is a side view of a motor vehicle cab extended in length of runway for a long sliding tilt. Fig. 8 is a fragmentary cross section of a side of a sliding tilt and the corresponding side of the vehicle as adapted to prevent side bulging of the tilt by heavy loads. Figs. 9 and 10 are detail views illustrating a wire rope and wheel force transmission means for dealing with a heavy tilt.

Referring to the drawings, the tilt or like *a* is slidingly mounted on the roof or sides of the cab *b* and supports upstanding from the truck floor *c*, appropriate antifriction bearings, as for example the rollers *d* and *e* being interposed for easy running. The rollers *d* may be mounted in tracks *f*, *f'* arranged on each side of the roof of the cab *b*, and co-operate with rails *g*, *g'* attached to each side of the tilt. The tracks *f*, *f'* may be appropriately shaped to correspond with the sloping roof of the cab.

The cab *b* as is usual, may be so much narrower than the truck-body that the tilt *a* or like, whose sides *h*, *h'* form a vertical continuation of and in the plane of the truck-sides, is capable of sliding over the cab.

The supports upstanding from the truck-body may be fixed parts *j* of the sides of the body, the remainder of the sides *k* being arranged as drop-sides. If the whole of the sides of the body are fixed, the supports may be fixed sides wholly or generally for easier sliding. *x* is the usual tailboard.

Lateral and vertical restraint of the tilt or like may be appropriately provided, examples of which are staple like slide guides *l*, *l'* fixed to the body with a return of each limb *m*, *m'* to overhang ledges *n*, *n'* on the sides of the tilt or like on the one hand, and the equivalent in the form of suitably supported side thrust and upper thrust resisting anti-friction bearings such as the rollers *e*, and co-operating slide-rails *o*, *o'* or the equivalent on the body and tilt or like respectively or vice versa.

Various slide or run-way systems for the sliding tilt or like may be adopted without departing from the present invention.

In its closed position the tilt or like may be securely fastened in divers ways. An example of a fastening which serves well consists of hooks *p* on each fixed or drop side of the truck-body into engagement with which slide screw-nutted bolts *q* on the sides of the tilt or like when this is slid from open to closed position. Fly or lever nuts screwed up tightly serve well to lock the tilt or like in its closed position. The hook fastening is shown attached to the inside of the drop side and bent to pass between the top of the drop side and the bottom of the tilt. The shoulder portion *w* thus formed assists in supporting the tilt in its normal position.

If the whole of the sides of the truck-body are arranged to drop down, the supports for the tilt as shown in Figs. 4 and 5 may be upturned end portions *r*, *r'* of a cross-iron or like *s* bolted to the longitudinal irons or like, or cross irons or like, of the body structure.

The rollers *e* upon which the tilt slides may be mounted in a staple-like extension *t* of the upturned portions *r*, *r'*, and this staple-like extension *t* also serves to prevent lateral movement of the tilt. The upturned portions *r*, *r'* may each be provided with a return limb to co-operate with the ledges *n*, *n'* on the tilt.

Screw-nutted bolts or like *y* may be fixed to the upturned portions *r*, *r'*, and corresponding holes *y'* in the drop sides engage therewith, the lever nuts *z* when tightened serving to lock the two parts together and make a firm support for the tilt in its normal position.

By truck-body or truck-floor is meant the load carrying part of a vehicle body as distinguished from the usually lighter and separate cab structure in which the driver is seated and sheltered.

The roofs of cab structures now in use may readily be adapted to provide tracks for a sliding tilt by fitting rails thereon. Anti-friction bearings may be carried by the rails and co-operating slides on the tilt or like, or the bearings may be carried on the tilt or like.

The cab roof tracks are arranged to overhang the back of the cab at *u* so as to share in the support of the tilt or like in its closed position as well as in leading or directing it over the cab at the commencement of its opening movement.

Any undesirable gaping between non-contacting upper edges of the sides of the truck-body and the lower edges of the sides of the tilt or like may be protected by any appropriate aproning, curtaining or equivalent, as for example, side strips of canvas or like, tonguing and grooving or rabbeting of the edges, water sheds, and so forth. Or the approximation of the non-contacting edges may be such as to make the gaping practically negligible.

Various clamping, locking, or damping or other devices tending to prevent or minimize shake and shock may be incorporated, clamping by screw or cam actions being examples. The clampings may be made onto yielding elements such as rubber pads or the like and screw or other adjustments may be provided for compensating wear.

A tilt under the present invention comprises a roof part and depending sides like or similar to the usual fixed tilt.

Vehicles without cabs may have the forward tracks or run-ways otherwise suitably supported.

For long vehicles 1 Fig. 7 designates extension brackets or like on which the overhang of a long tilt may be accommodated.

Fig. 8 shows one way of preventing side bulging of the tilt by steel channels 2 fitting over rails fixed to the sides of the vehicle, 3 being roller bearings riding on the tops of the rails.

Figs. 9 and 10 show one example of force transmission means consisting of a wire rope 4 connected at its opposite ends to the front and rear of the tilt and operated by a Chinese windlass 5.

What I claim is:—

1. The combination with a vehicle body provided with a rearwardly extending load platform, of a tilt sidably mounted on said vehicle body, a runway for said tilt at each side of said platform, and additional runways for said tilt located forwardly of said platform and in a horizontal plane above that of the first mentioned runways, whereby the weight of said tilt may be shifted from one set of runways to the other, as the tilt is slid forward to clear said platform or backward to cover same.

2. The combination with a vehicle body provided with a driver's seat and a load platform in rear of said seat, of a tilt slidably mounted on side vehicle body, a runway for said tilt at each side of said platform, and additional runways for said tilt located above said seat and in a horizontal plane above that of the first mentioned runways, whereby the weight of said tilt may be shifted from one set of runways to the other, as the tilt is slid forward to clear said platform or backward to cover same.

3. The combination with a vehicle body having a cab, of a covering for the body capable of sliding bodily into supporting relationship with said cab so as to expose the vehicle floor wholly or partially for the purposes described, supports for said covering extending backwardly from said cab, and supports for said covering extending forwardly over the cab at a higher level than said first mentioned supports.

4. The combination with a vehicle body having a cab, of a covering for the body capable of sliding bodily into supporting relationship with said cab so as to expose the vehicle floor wholly or partially for the purposes described, supports for said covering extending backwardly from said cab, and supporting rails for said covering extending over the cab and overhanging the back thereof at a higher level than said first mentioned supports.

5. In combination, a vehicle body having a cab and a load platform, tracks on the roof of said cab, said tracks overhanging the back of the cab, and a sliding tilt for said platform, said tilt sliding bodily into supporting relationship with said cab so as to leave the load platform clear for loading and unloading.

6. The combination with a vehicle body provided with a rearwardly extending load platform with drop sides hinged thereto, of a tilt slidably mounted on said vehicle body, a runway for said tilt provided on said drop sides at each side of said platform, and additional runways for said tilt located forwardly of said platform and in a horizontal plane above that of the first mentioned runways, whereby the weight of said tilt may be shifted from one set of runways to the other, as the tilt is slid forward to clear said platform or backward to cover same.

7. The combination with a vehicle body provided with a driver's seat and a load platform in rear of said seat with drop sides hinged to said platform, of a tilt slidably mounted on said vehicle body, a runway for said tilt provided on said drop sides at each side of said platform, and additional runways for said tilt located above said seat and in a horizontal plane above that of the first mentioned runways, whereby the weight of said tilt may be shifted from one set of runways to the other, as the tilt is slid forward to clear said platform or backward to cover same.

8. The combination with a vehicle body provided with a driver's seat and a load platform in rear of said seat, with drop sides hinged to said platform, of a tilt slidably mounted on said vehicle body, tracks carried by said tilt at each side of said platform, and runways for said tilt located in front of said platform, and in a horizontal plane above that of the first mentioned tracks, whereby the weight of said tilt may be shifted from one support to the other, as the tilt is slid forward to clear said platform or backward to cover same.

9. The combination with a vehicle body provided with a rearwardly extending load platform with drop sides hinged thereto, of a tilt slidably mounted on said vehicle body, a runway for said tilt provided on said drop sides at each side of said platform, and additional runways for said tilt located forwardly of said platform, whereby the weight of said tilt may be shifted from one set of runways to the other, as the tilt is slid forward to clear said platform or backward to cover same.

In testimony whereof, I affix my signature.

JOHN HERBERT SPARSHATT.